(12) United States Patent
Sezan et al.

(10) Patent No.: US 6,993,789 B1
(45) Date of Patent: Jan. 31, 2006

(54) DTV DATA SERVICE APPLICATION AND RECEIVER MECHANISM

(75) Inventors: Muhammed Ibrahim Sezan, Camas, WA (US); Regis J. Crinon, Camas, WA (US)

(73) Assignee: Sharp Laboratories of America, Camas, WA (US)

(*) Notice: Subject to any disclaimer, the term of this patent is extended or adjusted under 35 U.S.C. 154(b) by 554 days.

(21) Appl. No.: 09/298,282

(22) Filed: Apr. 23, 1999

(51) Int. Cl.
    *H04N 7/16* (2006.01)
(52) U.S. Cl. ................................. 725/142; 725/134
(58) Field of Classification Search .......... 725/67, 725/148, 134, 142, 7, 136, 139; 348/7; 386/1, 386/33, 83, 111–112
See application file for complete search history.

(56) References Cited

U.S. PATENT DOCUMENTS

| | | |
|---|---|---|
| 5,099,322 A | 3/1992 | Gove |
| 5,606,655 A | 2/1997 | Arman et al. |
| 5,635,982 A | 6/1997 | Zhang et al. |
| 5,664,227 A | 9/1997 | Mauldin et al. |
| 5,708,767 A | 1/1998 | Yeo et al. |
| 5,732,146 A | 3/1998 | Yamada et al. |
| 5,767,923 A | 6/1998 | Coleman, Jr. |
| 5,774,664 A | 6/1998 | Hidary et al. |
| 5,778,181 A | 7/1998 | Hidary et al. |
| 6,233,389 B1 * | 5/2001 | Barton et al. .............. 386/46 |
| 6,236,395 B1 * | 5/2001 | Sezan et al. ............... 725/61 |
| 6,295,647 B1 * | 9/2001 | Ramaswamy .......... 725/136 |
| 6,332,144 B1 * | 12/2001 | deVries et al. .......... 707/102 |
| 6,357,042 B2 * | 3/2002 | Srinivasan et al. ......... 725/32 |
| 6,389,168 B2 * | 5/2002 | Altunbasak et al. ...... 348/700 |
| 6,430,357 B1 * | 8/2002 | Orr ........................ 386/111 |

OTHER PUBLICATIONS

SMASH—Final Report (Public Report). Oct. 10, 1998. (reference attached).*
Persoon, Eric H.J. SMASH—A Concept for Advanced Use of Storage in the Home. Proceedings of Imagina'98, Mar. 4-6, 1998, Monaco (reference attached).*
Carrer, M., Ligresti, L., Ahanger, G. & Littele, T. (1996), 'An annotation engine for supporting video database population', MCL Technical Report No. 08-15-1996.*
Persoon, Eric H.J. *SMASH—A Concept for Advanced Use of Storage in the Home.* Proceeding of Imagina'98, Mar. 4-6, 1998, Monaco. (reference attached).
Hanjalic, A., Ceccarelli, M., Lagendijk, R., Biemond, J. *Automation of Systems Enabling Search on Stored Video Data.* Proceedings of the SPIE; Storage and Retrieval for Image and Video Database V. vol. 3022. 1997.

* cited by examiner

*Primary Examiner*—John Miller
*Assistant Examiner*—Scott Beliveau
(74) *Attorney, Agent, or Firm*—Marger Johnson & McCollom P.C.

(57) ABSTRACT

A system for providing a data broadcast service for digital television receivers. The system includes a data authoring system for creating a program description, a data service encoder for combining the description with other information and encoding it, and a multiplexer for using the encoded data service information into a transport data stream. A receiver at the client end receives the transport data stream and extracts the data and the audiovisual program and builds a summary for the viewer.

12 Claims, 5 Drawing Sheets

DTV DATA SERVICE APPLICATION AND RECEIVER MECHANISM

BACKGROUND OF THE INVENTION

1. Field of the Invention

This invention relates to digital television broadcast methods, more particularly to a data service associated with a digital television broadcast and a receiver mechanism that utilizes the data service.

2. Background of the Invention

The amount of broadcast information available to television viewers is extremely large and expanding. With the advent of digital television, even more content and more information will become available. This incredible amount of information and content makes it very difficult for viewers to sort through what is available and to determine what they want to see.

However, even though digital television broadcasts will increase the amount of information available, it has mechanisms within it that can be utilized to help viewers sort through the information. The Audiovisual Program and System Information Protocol (PSIP) is a broadcast of service information that allows the viewer to access information about the content of a given audiovisual program, such as its title and its scheduled time of broadcast. Audiovisual programs as defined here include events as defined by PSIP and other types of broadcasts and is not intended to limit the types of broadcasts in any way.

Even with the information available from the PSIP, however, the amount of content a viewer can see in any given period of time is limited. Audiovisual programs may be stored to be viewed later or only a summary or highlight of the audiovisual program may be desired for quick discovery and browsing of contents, viewing key events, viewing key objects such as famous characters. A visual summary or highlight is formed by a set of frames (key frames) or a combination of segments or clips (key clips) that are most representative of the program content or containing an event or a character of interest.

In addition, with the use of digital signals and digital equipment, the capability to store audiovisual programs in some sort of memory will become more available. The viewer may not want the entire audiovisual program stored, but only a representative section of the audiovisual program, or only important events in the audiovisual program. Summaries or highlights would again be useful in this situation. Summaries and highlights are obtained as a result of filtering out unimportant parts of audiovisual programs; they include important segments or clips of the program.

Viewers can use the PSIP information to find and choose the programs they want to watch, which will be referred to as filtering the available programs. However, PSIP does not include information to filter out uninteresting parts of a particular program, such as summarizing and generating a highlight of a program. Therefore, a need exists for broadcasts to include summaries or references to already-identified important events in an audiovisual program that allows the viewer to efficiently manage and customize the viewing of the audiovisual program.

SUMMARY OF THE INVENTION

One embodiment of the invention is a system for providing a thin data broadcast service for digital television. The system includes a data service-authoring module, in which program descriptions are developed for each audiovisual program. The descriptions could be developed by programming personnel who fill in the necessary information for the data service modules, an automated visual indexing and referencing system, or a combination of the two. The descriptions are encoded with any other available information and sent to a multiplexer. The multiplexer then converts that data service information into a data transport stream, such as an MPEG-2 transport stream.

Another aspect of the invention is a receiver that includes the capability to take the MPEG-2 transport stream with the encoded data service and convert it into program summaries or to filter the audiovisual program on-line. The receiver takes the references sent along with the audiovisual program and uses them to extract the associated key clips from the audiovisual program and to build the summary for the viewer.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
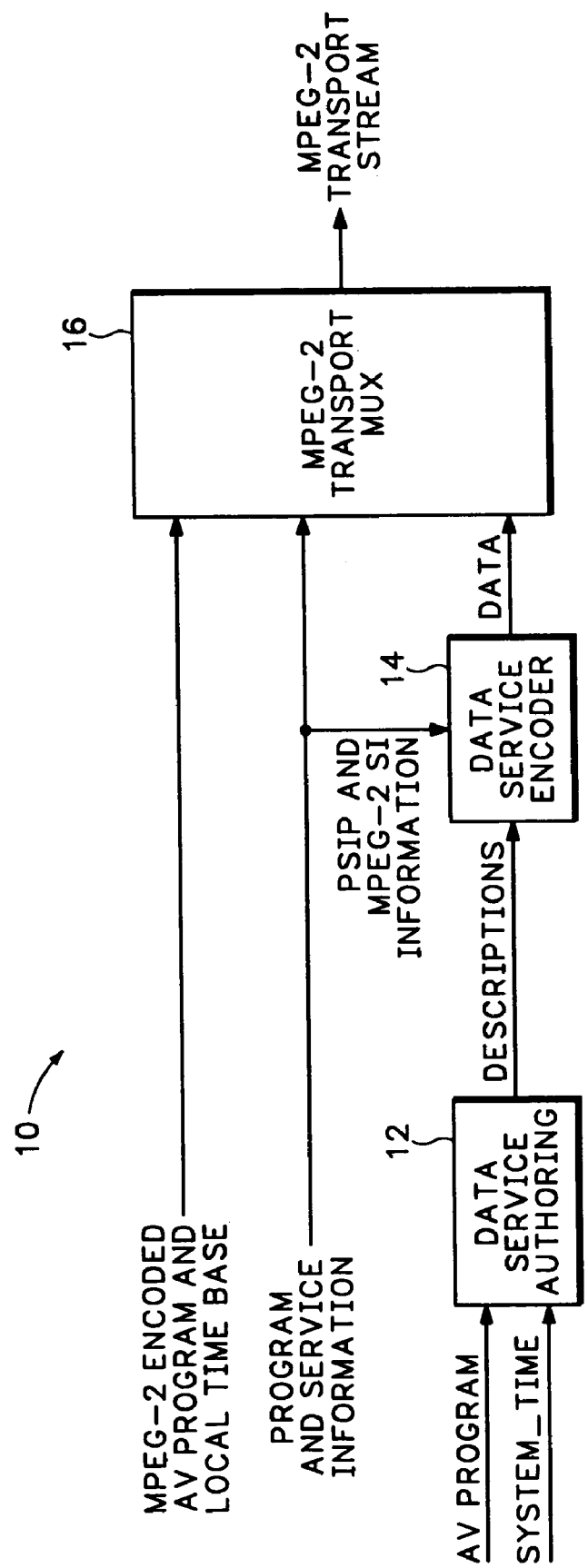
FIG. 1 shows one embodiment of a service provider system in accordance with the invention.

With the increased content available to viewers, information services and other means of identifying and sorting information need to be used to prevent the viewer from being overwhelmed. For the purposes of this discussion, this sorting and identifying process will be referred to as filtering. The actual filtering process takes place in the client receiver, using the information transmitted as part of this invention.

Filtering can occur at several different levels. First, audiovisual program level filtering will select between types of audiovisual programs. Again, audiovisual program here is used to describe any type of broadcast event, from movies, television audiovisual programs, sporting events, concerts, etc. After the audiovisual program is selected, within-audiovisual-program filtering may occur based upon key-events or objects, transmitted along with the audiovisual program.

Key-events can include such things as scoring occurrences during a sporting event, important parts of movies or television shows, and certain news stories that are of interest to a viewer, included within a news broadcast. Object level filtering is a type of within-audiovisual-program filtering that locates clips containing a particular object, such as all the scenes containing a close up of a particular actor or character. The sequences located by either of these filtering techniques will be referred to as key clips. Key clips correspond to key events or objects. The term 'key clips' can also include audio information, associated text or other relevant information. The descriptions of the boundaries of the key clips are transmitted in the service, such as a list of time references for the clip. Key frames are special cases of key clips, i.e.; they can be viewed as key clips that contain a single frame. The receiver then develops the summary, or the highlights, by rendering the key clips.

These types of summaries enable quick discovery and browsing of the audiovisual program content, or viewing only the parts of the program that is of interest to the viewer. The location of the key clip is stored relative to the entire video audiovisual program. This allows playback of the original video audiovisual program from the location of a key clip. Key clips can be played back successively to form an audiovisual summary or highlight of the program.

A viewer can also customize the filtering of key clips to customize the summary, such as selecting clips based only upon goals of one's own team in a soccer game or selecting the clips containing the lead actor or selecting clips containing the news stories that are of interest. A viewer can also choose key clips that provide a summary of varying duration, as they are played back in a concatenated fashion, e.g., a 10 minute-summary versus a 5-minute summary of a basketball game. Summaries allow viewers consume more relevant information by concentrating on salient parts of programs, or reduce their viewing time, and customize their viewing experience.

The process of identifying these key clips occurs at the service provider end or at the viewer's end. Ongoing research in computer vision has developed techniques in modeling and detecting key events of a particular domain using audiovisual cues and inference models. However such activities, while promising, are far from being robust enough for various types of current audiovisual programs.

Therefore, this discussion will focus on the service provider part of a summarizing or key clip service as well as the means to deliver them to the viewers. Digital television broadcast standards include bandwidth for broadcasting such information along with content, and there are standard protocols in place that provides for announcement and transmission of such information.

In the ATSC (Advanced Television Standards Committee) suite of standards, the typical 6 MHz physical channel can be used to deliver multiple digital TV audiovisual programs (virtual channels) as well as data services. A subcommittee of the ATSC Technical Committee, the T3S13 Working Group is currently developing the standards for the transmission of data services. These data services may or may not be associated with an audiovisual program. Within the physical channel, audio and video elementary streams and data elementary streams are multiplexed according to the ISO/IEC 13818-1 (MPEG-2 Systems) specifications. This multiplex also contains information about audiovisual programs carried by the virtual channels.

Additionally, there is a standard specification for publishing present and future audiovisual programs called Program and System Information Protocol (PSIP) which provides a mechanism that can be used in methods of this invention. The PSIP provides a standard for transmission of system information, data services and audiovisual programs. The PSIP information is multiplexed with the video, audio and data elementary streams into the MPEG-2 Transport Stream. In particular, the PSIP is a collection of tables that contains information at system and audiovisual program levels of all virtual channels including data channels carried in a particular transport stream.

For example, a particular system level table in PSIP is the System TimeTable, which serves as reference for time of day. The VCT, virtual channel table, contains a list of all the channels that are or will be on line plus their attributes such as the list of audiovisual events to be broadcast along with their start time and duration. ETT, extended text tables, carries optional text descriptions of audiovisual and data programs that can be used in forming an electronic audiovisual program guide (EPG). All of this information can be used in building key clips of various audiovisual programs. While all the above protocols and structure names are in the United States, analogous information is provided in other countries. Europe, for example, sets out very similar structures in the Digital Video Broadcast (DVB) specification, called DVB-SI.

The use of this invention is not intended to be wed to any particular standard. The information necessary to precut this invention will be available in either the above-discussed formats or some analogous formats. For ease of discussion, the format of the ATSC will be used, with no intention of limiting the applicability of this invention to any one standard.

Similarly, the following table describes various terms that will be used in describing aspects of the invention. In no way is the use of these descriptors intended to limit applicability of the invention to other standards.

| Term | Description |
| --- | --- |
| psip_source_id | a point field which correlates an audiovisual/data program to a virtual channel |
| psip_program_id | the identifier of the audiovisual/data program |
| event_descriptor | descriptors of key events |
| event_start_reference | time reference to the start of the key event |
| event_end_reference | time reference to the end of the key event |
| origin_reference | origin of reference relative to which the event start and end references are defined |
| event_start_audiovisual program_clock | starting time of a key event in terms of the absolute audiovisual program clock, for example in a soccer game, the game clock |
| event_end_audiovisual program_clock | ending time of a key event in terms of the absolute audiovisual program clock, for example in a soccer game, the game clock. |
| object_descriptor | descriptors of objects |
| object_start_time | time reference to the start of an object's appearance |
| object_end_time | time reference to the end of an object's appearance |
| object_start_audiovisual program_time | start time of an object's appearance referenced to the start time of the audiovisual program, for example 'ten minutes after the start of the audiovisual program' |
| object_end_audiovisual program_time | end time of an object's appearance referenced to the start time of the audiovisual program, for example 'ten minutes after the start of the audiovisual program' |
| object_start_position_x | spatial position of the object on the x-axis when it appears |
| object_start_position_y | spatial position of the object on the y-axis when it appears |
| object_end_position_x | spatial position of the object on the x-axis when it stops appearing |
| object_end_position_y | spatial position of the object on the y-axis when it stops appearing |

Some specific information must be noted with regard to some of the above descriptors. For example, psip_source_id may be equal to the field source_id in the TVCT (Terrestrial Virtual Channel Table) or CVCT (Cable Virtual Channel Table) table specified by PSIP. The data service may contain descriptors about more than one virtual channel differentiated by psip_source_id. Similarly, the psip_program_id may be the same as the field event_id in the EIT table specified by PSIP.

The descriptors above that use the term 'event' are for key events. Those that use the term 'object' are used for object filtering. Either one of these applications of the invention may use duration information instead of ending references.

Having established a defined vocabulary for use in discussing various applications of the invention, the discussion now turns to one embodiment of the invention. This embodiment is shown in FIG. 1.

FIG. 1 shows one embodiment of system 10 for providing data services for television broadcasts in accordance with the invention. The audio-visual information is received and played and the descriptions are authored at the authoring system 12. The authoring step can be manual, with audio-visual programming personnel actually entering the relevant data into the appropriate fields of the above table. Other forms of the authoring step includes automatic authoring using the modeling and inference techniques mentioned before, or a mix of the two. One of the functionality of the Data Service Authoring unit may be to identify the presence of pre-defined objects and capture their positions in the video. In this case the fields object_start_position_x, object_start_position_y, object_end_position_x, object_end_position_y are used to build a record of an object position in consecutive frames.

In this particular embodiment, the timing of the key events or the object fields are referenced by the system time, which is used in the authoring step 12. Here the system time is assumed to be a GPS (Global Positioning System) or a CUT (Coordinated Universal Time) time. The descriptions are then used at the data service encoder 14, along with the PSIP information and MPEG-2 System Information (SI) to complete the data to be provided along with the content. This data is then multiplexed in with the PSIP and the MPEG-2 encoded audiovisual programs at multiplexer 16. The result is the MPEG-2 transport stream with both the program content and information sent to the viewer.

The use of system_time at authoring system 12 has effects on the fields event_start_reference and event_end_reference, or on the analogous object fields. In the case of live broadcasts, the event_start_reference give the time in terms of the time line provided by the System Time Table (STT) specified in the PSIP. PSIP information is used both in the data service encoding step and sent directly to the receiver. A summarizer circuit, discussed in more detail later, may use this to locate starting frames of key clips corresponding to key events. The similar process occurs for the event_end_reference to locate the ending frame.

In the case of audiovisual programs pre-recorded in the receiver, the system_time will reflect the current time of day, not the audiovisual program time. The system_time cannot be used in specifying the event references. The data service should then provide time references for the events via the event_start_reference and event_end_reference, relative to the specified origin. The specified origin is then specified by origin_reference.

The data receiver system, in this example, forms a table of time references and the corresponding frame numbers, or byte offsets of the video bitstream. These references are then stored along with the audiovisual program for use in accessing the start and end frames of the key clips. The table will be referred to as the key clip map table, which will be discussed in more detail further on.

Figure 2:
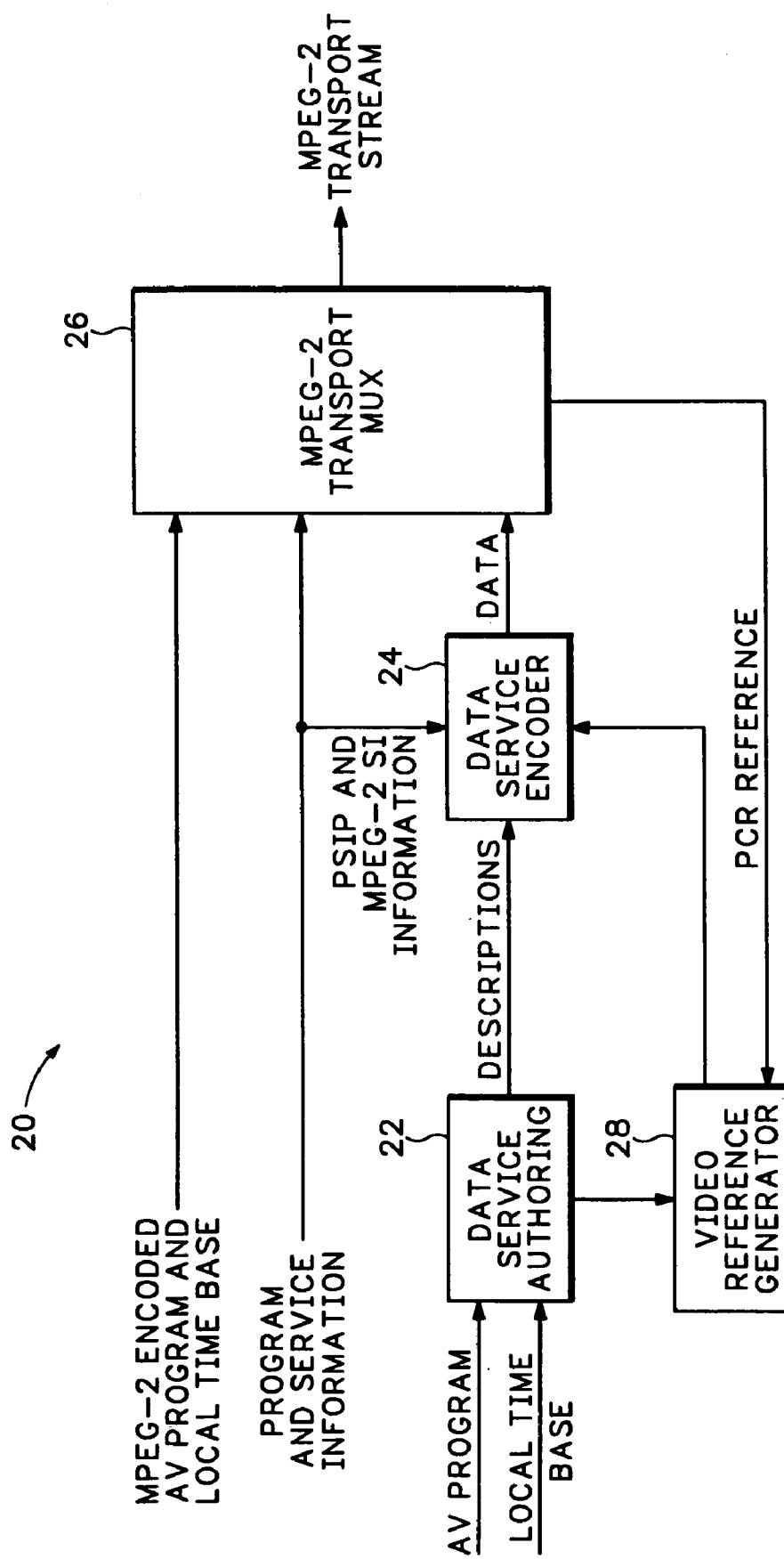
FIG. 2 shows a second embodiment of a service provider system in accordance with the invention.

An alternative embodiment is shown in FIG. 2. The provider system 20 uses time references derived from MPEG-2 Program Clock Reference (PCR), which the multiplexer uses to capture presentation times associated with an access unit. The data service authoring system 22 uses the common local time base to reference the key-clips. The multiplexer 26 assigns Presentation Time Stamps (PTS) to audio, video and data access units (the later occurs only if the data service is synchronized to the video or audio stream). PTSs and PCRs are samples of the same 90 KHz clock. PCRs are inserted in the MPEG-2 Transport Stream to allow each DTV receivers to reconstruct its Receiver System Clock.

The authoring and encoding systems specify reference to the video using a local time base. In the Data Service Authoring unit, the time associated with an event is captured as a Local Time stamp, that is a sample of the local time base. A PCR Reference is necessary before encoding the data, so a return channel from the multiplexer 26 sends a reference PCR to the video reference generator 28. As the PCR Reference is input to the Video Reference Generator 28, the authoring system 22 sends the Local Time Reference to the video reference generator 28. In effect, the Local Time Reference corresponds to the PCR Reference provided by the multiplexer. The video reference generator 28 then returns a descriptor or a well-defined structure to the Data Service Encoder 24. The descriptor includes both the Local Time Reference and the PCR Reference such that the receiver will be able to reconstruct a continuous Local Time clock from these descriptors and the MPEG-2 Receiver System clock.

Several options for sending the necessary information from the multiplexer 26 to the video reference generator 28 are available. The delivery can occur automatically without any requests, or initiated every time a new PCR is issued, among other techniques. The video reference generator may employ a buffer for holding and using the most recent PCR-local time code pair, flushing out this pair as the new pair arrives.

The key clip map table will contain a table of Local Time samples versus video frame units such as frame number or byte offset within the video bitstream, for this example. In this situation, the field event_start_audiovisual_program_time, event_end_audiovisual_program_time, object_start_audiovisual_program_time, object_end_audiovisual_program_time are used to construct the tables.

Figure 3:
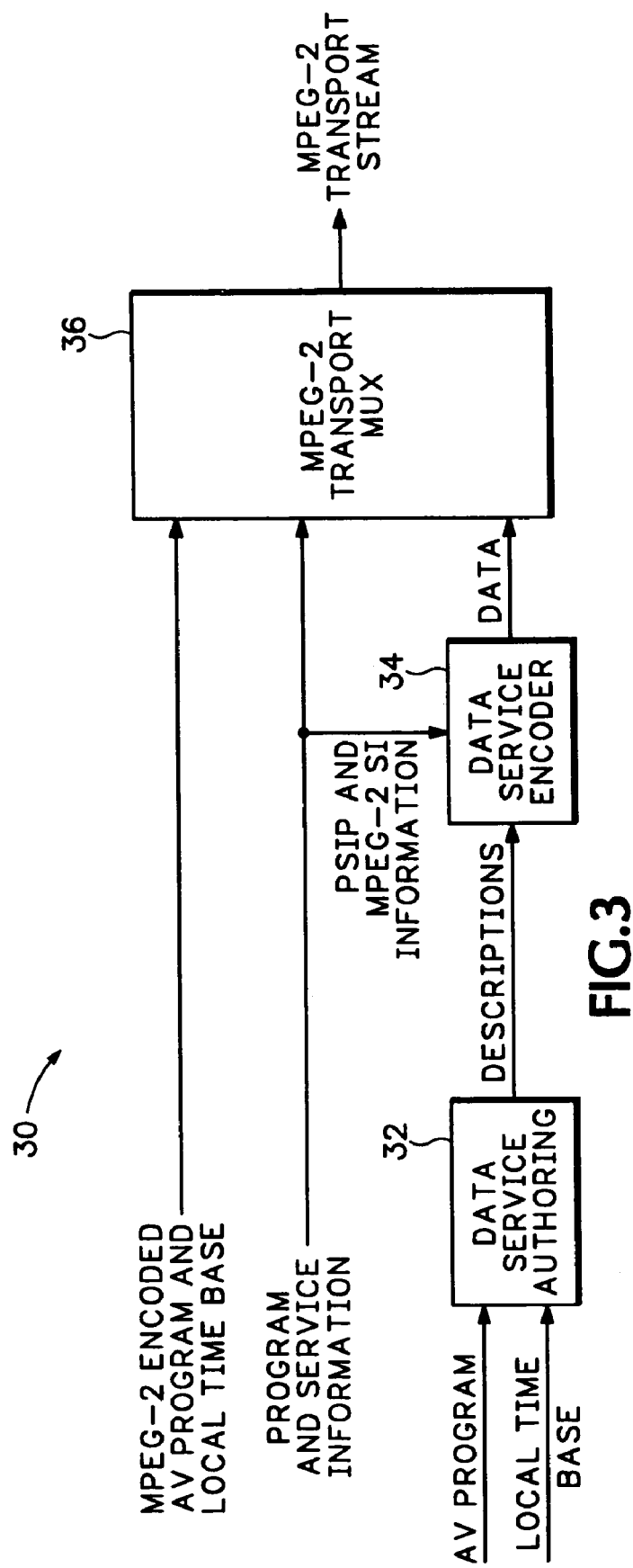
FIG. 3 shows another embodiment of a service provider system in accordance with the invention.

A third alternative for a data service provider system is shown in FIG. 3. This alternative assumes tight synchronization of the data service with at least one element of the audiovisual program. For pre-recorded material, for example, the service provider may perform a pre-analysis of the audiovisual program and hence the data service can be fully synchronized with the preparation and presentation of the audiovisual program. The content of the data service is simplified. It will merely contain starting and ending flags (triggers) for the key events instead of explicit references to the video frames. The tight synchronization between video and data service is achieved using the ISO/IEC 13818-1 (MPEG-2 Systems) PCR and PTS time-stamped based mechanisms at the multiplexer.

Figure 4:
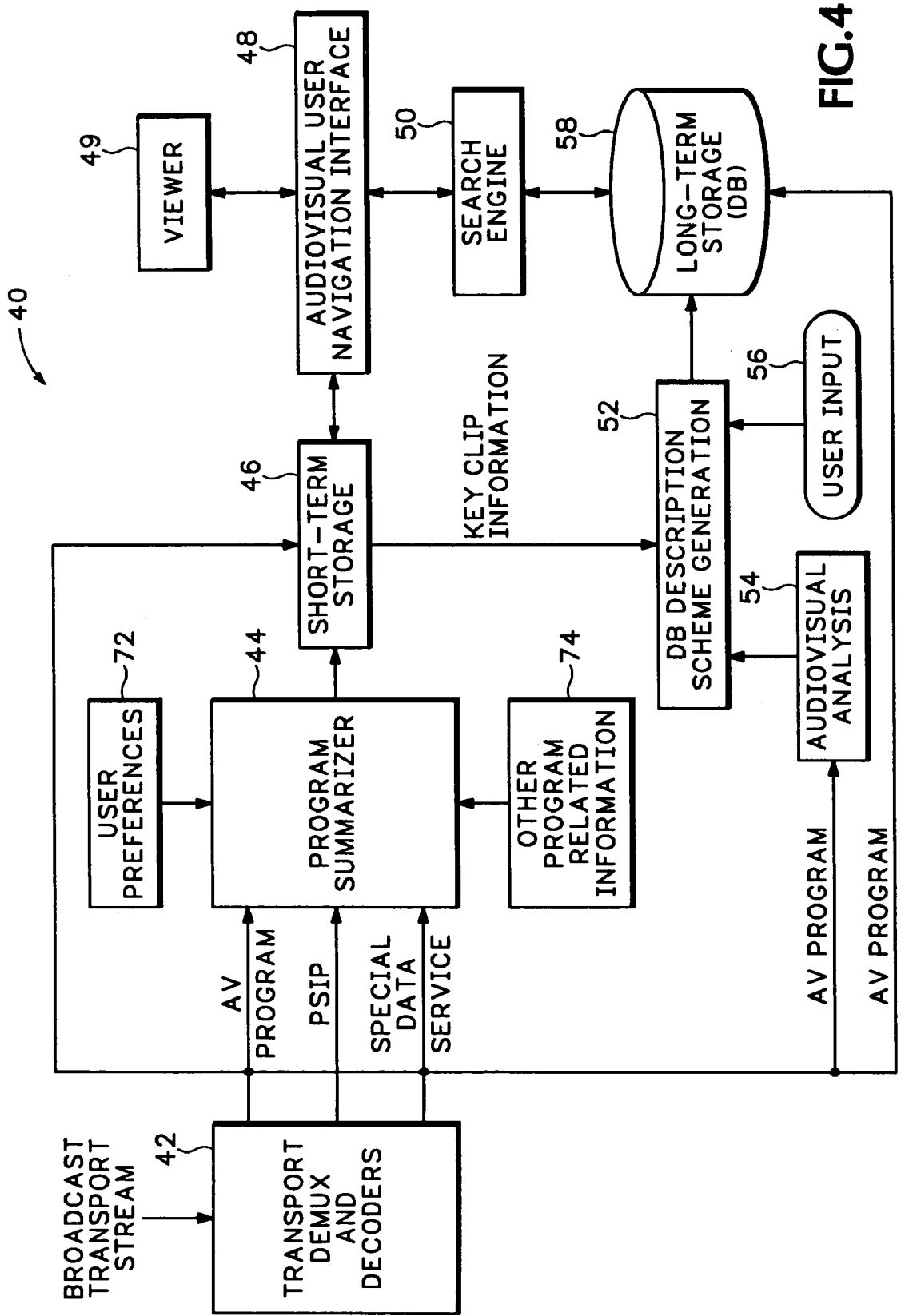
FIG. 4 shows a system for providing audiovisual program summaries for a viewer in accordance with the invention.

Up to this point, the discussion has focused on the provider of the data service. Specialized equipment at the receiving end can use the information from the data service provider. One example of such a receiver is shown in FIG. 4.

The receiver 40 has an audiovisual program summarizer circuit 44, which receives the broadcast demultiplexed, depacketized, and decoded data from the demultiplexer and decoders 42. The audiovisual program can be stored directly in short-term memory 46, if desired, and/or just the summary produced by the summarizer can be stored. The short-term memory 46 may be a computer hard disk. A viewer 49 can then access the short-term memory via audiovisual user navigation interface 48 to select a program of interest, view its summary, and browse the audiovisual program itself, if desired, guided by the visual summary.

The audiovisual user navigation interface in this example is similar to a web browser but it is capable of browsing audiovisual programs in addition to web pages. Any type of user-friendly interface can be used that allows this dual browsing capability, including those that provide for more types of browsing. In addition, the information extracted from the data service, such as the key clip information, and the summary generated by the summarizer can be used in generating an index. The description scheme generator unit 52 generates the index if the program is to be archived for long-term in a long-term storage unit 58.

The long-term storage unit stores one or more programs along with their corresponding description schemes. The long-term storage can be computer hard disk, or removable storage media such as DVD-RW or tape. The description scheme is used as a set of indices for subsequent retrieval of the program. In addition to key clip information extracted from the data service, audiovisual analysis techniques 54 can be applied to the audiovisual program to automatically extract audiovisual descriptors that are incorporated into the description scheme. Further, viewers can manually provide via an appropriate interface 56 meta information to be included in the description scheme. Such information can include personal notes and annotation by the viewer. A search engine 50 can be used via the audiovisual user navigation interface 48 for information retrieval from long-term storage.

The search engine searches through the program description schemes to find the desired program. Once the desired programs are found, the search engine returns the results to the user. If long-term storage is a home server database, the search engine returns the audiovisual program to the user through the audiovisual navigation interface 48. If long-term storage is removable media, the search engine returns the reference to the removable storage media that contains the desired program.

Figure 5:
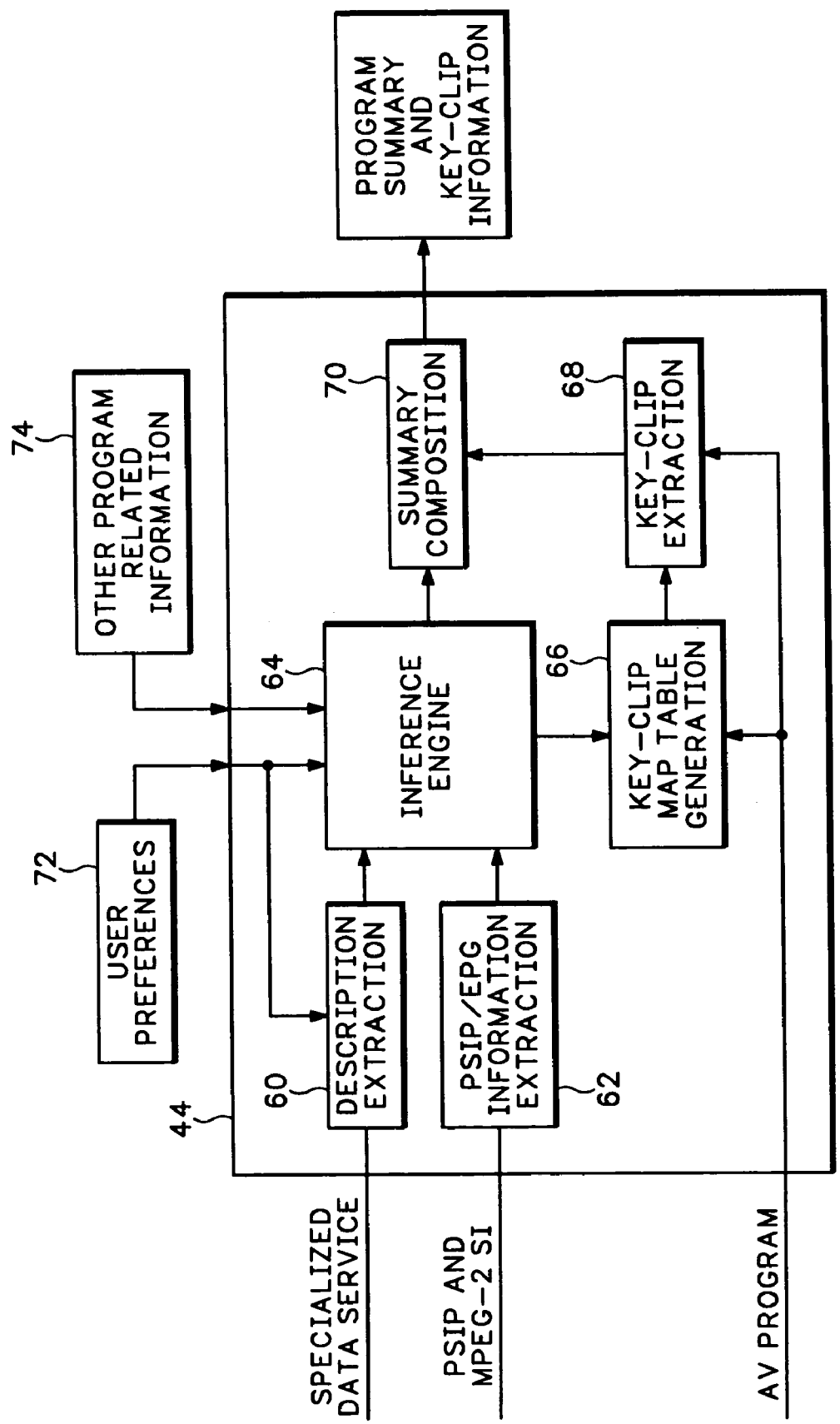
FIG. 5 shows one architecture for an audiovisual program summarizer in accordance with the invention.

The audiovisual program summarizer 44 is shown in more detail in FIG. 5. The data service input is received by a description extraction module that parses and extracts the audiovisual program description created by the data service authoring module in any of FIGS. 1–3. This module gets the audiovisual program enhancing information from the data service or the PSIP information or the MPEG-2 System Information (SI) and invokes corresponding description decoders. The corresponding description decoders use the syntax and semantics of descriptors that are appropriate for the particular audiovisual program, each type of auxiliary information, and interpret the descriptors. These can be included as modules, as shown here.

MPEG-7 is an emerging ISO standardization activity that is aimed at standardizing descriptors of content of audiovisual information. As MPEG-7 is finalized, such decoding modules may correspond to standard decoders. Similarly, the PSIP extraction module 62 extracts the PSIP and/or the MPEG-2 SI information. It decodes and extracts contents of tables from the PSIP or MPEG-2 SI that are referenced by the specialized data service, such as VCT, STT, EIT and DIT. The module may also extract contents of ETTs for enhancing the final summary.

The inference engine 64 then combines these extracted data streams with other audiovisual program related information as well as user preferences, which may or may not be available. Other audiovisual program related information 74 could be used to further enhance the summary. Such audiovisual program related information, for example, may be downloaded from the World Wide Web. For instance, if the audiovisual program is an NBA game, the game statistics and a recap of the game can be downloaded from a web site (e.g., NBA home page) and used in addition to the video clips in order to further enhance the summary.

User preferences input 72 may include a certain choice of certain types of events or characters amongst those provided by the data service. For instance, a user may prefer to see a program summary containing clips of slam dunks by Michael Jordan only, whereas the data service may include information about any slam dunk in the game by any player, all 3-pointer shots, etc. The user may also specify a preference for the length of the summary or game highlight that is desired, such as a 10 minute versus a 20-minute summary. The inference engine selects the clips that will form the summary, which will best fit to user preferences.

The inference engine may contain knowledge bases for different domains of programs, such as sports or within sports like basketball, which can be used in satisfying the user preference on duration of the summary. For short summaries of a basketball game, for example, the inference engine may give more weight to clips from later quarters of the game rather than the first quarter. The inference engine then supplies information about the selected key clips to the key clip map table generation module 66 that generates the map of video references and associated times. The links between the audiovisual program content and the times is determined by the embodiment of the service provider systems, as discussed with regard to FIGS. 1–3.

The description extraction module 60 also contains means for extracting the descriptions for a desired program only, according to user preferences, when the data service contains descriptions for more than one program in the same physical channel.

The key clips are then extracted according to the table by the extraction module 68. This module may include MPEG-2 video and audio decoders and includes means for extracting timing information that facilitates the references to the audiovisual programs. The summary is then built at module 70 and provided to the user. From the inference engine, the summary composition module also receives program related information that is going to be used in addition to key clips in composing the final summary that will be available to the user.

Thus, although there has been described to this point a particular embodiment for a method and apparatus for provided a television data service, it is not intended that such specific references be considered as limitations upon the scope of this invention except in-so-far as set forth in the following claims.

What is claimed is:

1. A system for providing a digital television data broadcast service, comprising:
    a data service authoring subsystem operable to receive an audiovisual program and to author key clips, wherein key clips are comprised of one of either at least one key event or at least one key object, and provide key clip data in a defined format identifying the key clips of the audiovisual program, wherein said defined format identifying key clips of an audiovisual program further comprises an identification of the content of the key clip, wherein said content includes events and objects associated with said key clip;
    a data service encoder operable to receive said key clip data and Program and System Information Protocol data, wherein key clip data includes descriptors that directly correspond to descriptors in the Program and System Information Protocol data, and finalize contents of said data broadcast service; and an MPEG-2 system multiplexer operable to multiplex said contents of said data broadcast service with encoded audiovisual programs and produce a MPEG-2 transport stream to be broadcast to at least one client receiver in a format that allows customization at the receiver.

2. The system as claimed in claim 1, wherein said key clips are referenced using Program and System Information Protocol system time.

3. The system as claimed in claim 1, wherein said key clips are referenced using Local Time reconstructed in the receiver from transmitted MPEG-2 Program Clock References (PCR) and Local Time References pair.

4. The system as claimed in claim 3, wherein said system includes a video reference generator.

5. The system as claimed in claim 1, wherein said key clips are referenced using starting and ending flags transmitted in synchronization with an element of said audiovisual program.

6. The system as claimed in claim 1, wherein said defined format identifying key clips of an audiovisual program further comprises starting and ending references for said key clips.

7. A receiver operable to receive and operate upon a digital television data broadcast service, comprising:
  a demultiplexing and decoding module to extract program-related information, wherein the program-related information further comprises an MPEG-2 encoded audiovisual program, Program and System Information Protocol (PSIP) information, and an audio visual program description and references to key-clips from the digital television data broadcast service;
  a summarizer operable to receive the audiovisual program PSIP information and references to key-clips and to create summaries of the audiovisual program, using the references to key-clips to extract the key-clips from the program, wherein the summarizer includes an inference engine operable to combine said audiovisual program description with said PSIP information, wherein descriptors in the audiovisual program description directly correspond to descriptors in the PSIP information, user preferences, and any other available program information to produce program-related information and key-clip information;
  a navigation module operable to allow a user to browse said program-related information;
  a short-term memory to allow short-term storage of the summaries; and
  a long-term memory to allow long-term storage of the programs and the summaries, wherein the long-term storage is accessible from the navigation module.

8. The receiver as claimed in claim 7, wherein said decoding and demultiplexing module is operable to produce program-related information for within-program filtering of audiovisual programs.

9. The receiver as claimed in claim 7, wherein said program-related information further comprises description information usable as indices for database archival of said audiovisual programs.

10. The receiver as claimed in claim 7, wherein said receiver further comprises a register of user preferences, wherein said decoding and demultiplexing module and said summarizer use said user preferences in generating said program-related information and said summaries.

11. A program summarizer operable to receive a data broadcast service for filtering and generating summaries of audiovisual programs, comprising:
  a description extraction module operable to parse and extract an audiovisual program description provided by said data broadcast service;
  a program and system information extraction module operable to extract the program and system information protocol (PSIP) information and MPEG-2 System Information from said data broadcast service;
  an inference engine operable to combine said audiovisual program description with said PSIP information, where descriptors in the audiovisual program information directly correspond to descriptors in the PSIP information, user preferences, and any other available program information to produce program-related information and key-clip information;
  a key-clip map table operable to take said key-clip information and produce a map of video references and times;
  a key clip extraction module operable to extract key clips from said audiovisual program using references to the key clips in the data broadcast service; and
  a summary composition module operable to produce summaries of said audiovisual program and provide it to a viewer.

12. The summarizer of claim 11, wherein said any other available program information further comprises information downloaded from a web site.

* * * * *